United States Patent
Kawabata

[11] Patent Number: 5,904,460
[45] Date of Patent: May 18, 1999

[54] NUT HAVING FRUSTUM DISC SPRING AND WASHER FOR FASTENING WOODEN ARTICLES

[75] Inventor: Yukiyoshi Kawabata, Osaka, Japan

[73] Assignee: OPG Company Ltd., Osaka, Japan

[21] Appl. No.: 08/970,154

[22] Filed: Nov. 13, 1997

[51] Int. Cl.⁶ ..................................................... F16B 43/00
[52] U.S. Cl. ........................ 411/155; 411/531; 411/536; 411/533
[58] Field of Search .................................. 411/535, 536, 411/533, 372, 371, 155, 150, 531

[56] References Cited

U.S. PATENT DOCUMENTS

| | | | |
|---|---|---|---|
| 1,320,259 | 10/1919 | Martens | 411/155 |
| 1,945,005 | 1/1934 | Vacher | 411/155 |
| 3,009,176 | 11/1961 | Knocke | 411/533 |
| 3,631,910 | 1/1972 | Crowther | 411/155 |
| 5,364,214 | 11/1994 | Frzekas | 411/536 |

*Primary Examiner*—Flemming Saether
*Attorney, Agent, or Firm*—Antonelli, Terry, Stout & Kraus, LLP

[57] ABSTRACT

A washer based nut has a nut body (11), a frustum disc spring (12) of a countersunk shape and rotatably fitting on the nut body, and a washer (14) for bearing against wooden articles. The washer has a central bore (16) and a round recess (17) formed around the bore and in a top face of the washer, and the round recess (17) formed coaxial with the central bore has a diameter substantially equal to an outer diameter of the frustum disc spring (12) such that the latter is fitted in the round recess. Two or more portions of a circular periphery of the round recess (17) are deformed to retain the washer (14) on the frustum disc spring (12), so that the fastening works are rendered more efficient and manufacture cost of the nuts is reduced, under an easier management of the parts.

10 Claims, 2 Drawing Sheets

5,904,460

NUT HAVING FRUSTUM DISC SPRING AND WASHER FOR FASTENING WOODEN ARTICLES

BACKGROUND OF THE INVENTION

The present invention relates to a washer based nut comprising a washer that is combined with a nut body for use is fastening wooden articles such as foundations of wooden houses to certain anchor bolts whose feet are embedded in and secured to a footstall.

In general, the washers combined with such wooden article-fastening nuts must have a sufficient diameter and sufficient thickness so as not to 'cut' into those wooden foundations when said nuts are forcibly driven and tightened on the anchor bolts. According to the current standards, those nuts for instance of 'M14' class must be used with round steel washers 4 mm thick and having a diameter of 45 mm or, alternatively, with square steel washers also 4 mm thick and having a size of 45 mm×45 mm. The wooden foundations, and more particularly their portions thus pressed with those washers and nuts, may tend to become slender and lower the fastening effect thereof in the course of time. Therefore, an annular leaf spring has been interposed between each of those large washers and the nut body, in order to compensate any significant reduction in thickness of those foundation portions.

FIG. 5 shows one example of the prior art washer based nuts of the described type. In this example, a nut body 1 is attached to a large washer 3 serving as the 'base' for the nut body, with an annular leaf spring seat 2 intervening between them and these three parts forming an integral unit. Since each nut body is freely rotatable on and relative to the washer, such nut units reduce labor in construction works and are convenient to manage their parts.

However in the prior art washer based nut shown in FIG. 5, the nut body 1 must comprise a tall cylindrical boss 4 continuing therefrom towards the washer that has to be combined with the nut body. The rim defining a free open end of this boss has to be deformed uniformly and centrifugally within the washer 3 underlying the spring seat 2. The step of deforming the cylindrical 'boss' end in this way is somewhat difficult and noticeably raises overall manufacture cost. A round recess 5 formed in the bottom of washer 3 and around the central bore thereof for rotatably receiving the cylindrical boss 4 does leave there a thin annular shoulder 6. Since this thinned shoulder is subject to a strong thrust imparted thereto when fastening the nut, it has been difficult for the central portion of the washer to realize its full strength inherent in the increased thickness.

SUMMARY OF THE INVENTION

The present invention was made in view of the drawbacks inherent in the prior art nuts for fastening wooden articles. An object of the present invention is therefore to provide a washer based nut of an improved type free from those drawbacks and capable of being manufactured inexpensively.

In order to achieve the object, the present invention provides a washer based nut comprising: a nut body; a frustum disc spring of a countersunk shape; the disc spring rotatably fitting on a foot portion of the nut body; and a washer disposed beneath the disc spring so as to bear against wooden articles. The washer has a central bore and a round recess formed around the bore and in a top face of the washer, the round recess facing the nut body and the frustum disc spring and surrounded by a circular periphery. The round recess formed coaxial with the central bore has a diameter substantially equal to an outer diameter of the frustum disc spring such that the latter is fitted in the round recess, wherein at least two portions of the circular periphery defining the recess are deformed to retain the washer on the frustum disc spring.

The foot portion of the nut body may preferably be a cylindrical boss that continues from the nut body and is of a reduced length as compared with those employed in the prior art nuts of this kind.

THE PREFERRED EMBODIMENTS

Figure 1:
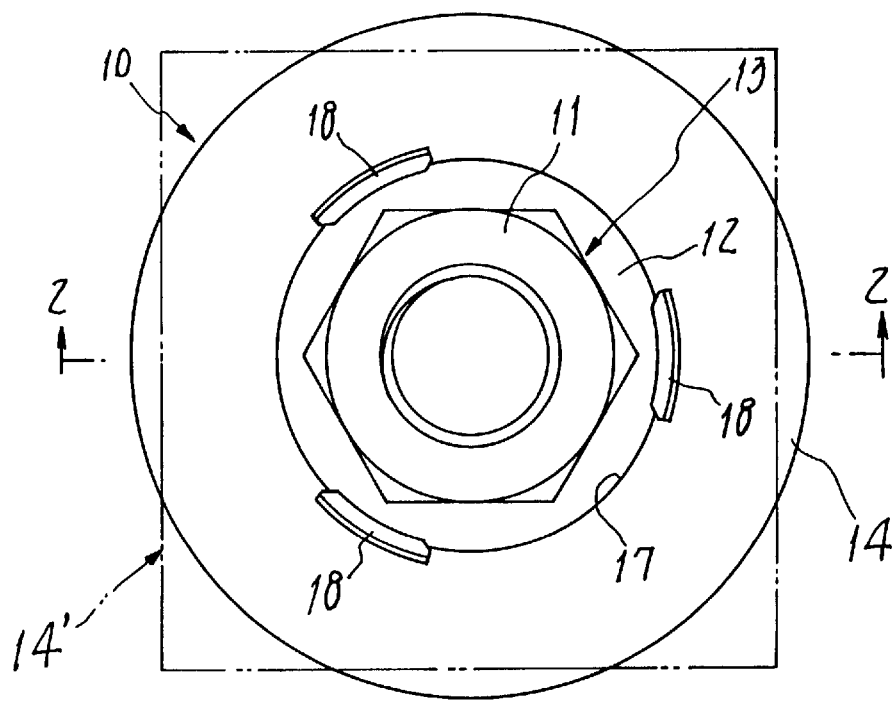
FIG. 1 is a plan view of a washer based nut provided herein for fastening wooden articles.
Figure 2:
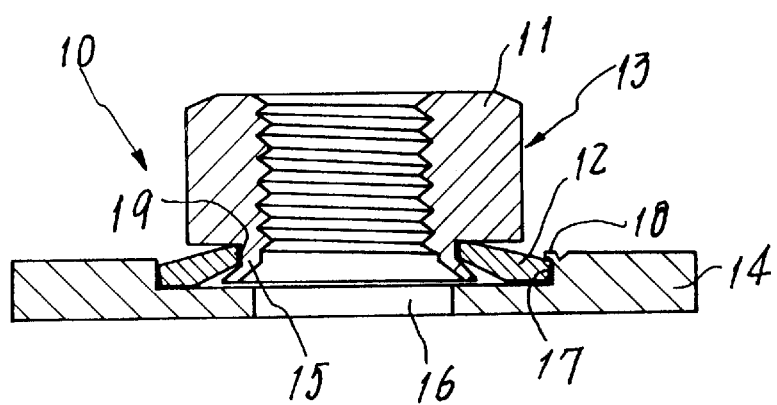
FIG. 2 is a cross section taken along the line 2—2 in FIG. 1.
Figure 3:
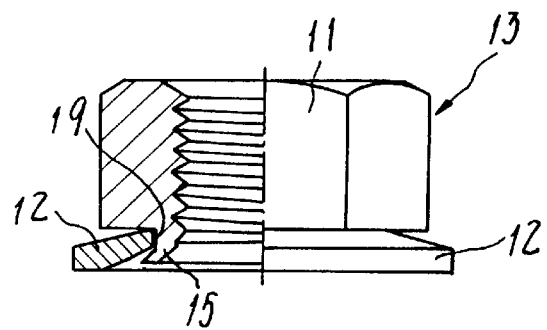
FIG. 3 is a partial vertical cross section of a nut body and a frustum disc spring, both forming a principal part of the washer based nut.
Figure 4:
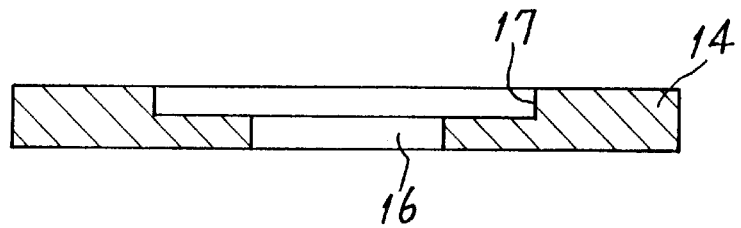
FIG. 4 is a vertical cross section of a washer as another part of the washer based nut.
Figure 5:
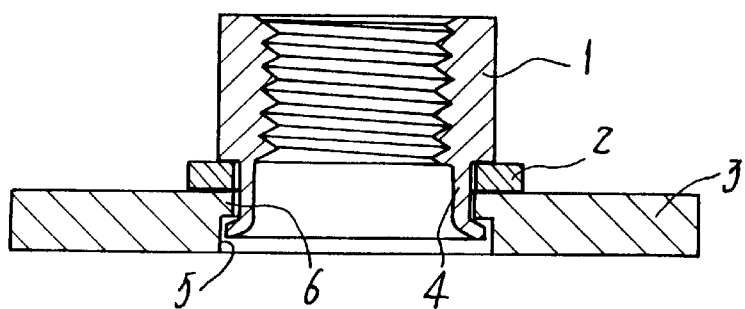
FIG. 5 is a cross section of an example of the prior art washer based nut.

Now some embodiments of the present invention will be described referring to the drawings, in which FIGS. 1 and 2 illustrate a washer based nut generally indicated at 10. The nut 10 consists of a main part 13 and a washer 14 shown in FIG. 4 and having a diameter increased to bear against wooden articles. As shown in FIG. 3, the main part 13 consists in turn of a nut body 11 and a frustum disc spring 12 of a countersunk shape and rotatably fitted on the nut body. The nut body 11 accompanied by the disc spring 12 is one of ordinary types available on market, in which the nut body 11 has a short cylindrical boss 15 fitting in the disc spring 12. A circular free end of this boss 15 is deformed radially and outwardly to hold the disc spring to be freely rotatable relative to the boss. On the other hand, the washer 14 is of a standard shape and size, except for a round recess 17 detailed below. If the nut body 11 is classified for instance in the group 'M12', then the washer 14 made of a steel plate having a thickness of 4 mm has an outer diameter of 45 mm and a central bore 16 whose diameter is 13 mm (for receiving a bolt). The round recess 17 for fitting on the frustum disc spring is formed coaxial with the central bore 16 and disposed in the top side of the washer so as to face the nut body (thus located opposite to the bottom side bearing against the wooden articles). The round recess 17 has a diameter substantially equal to or slightly greater than the diameter of frustum disc spring 12 and a depth generally corresponding to a half thickness of the washer 14.

In manufacture, the frustum disc spring 12 accompanying the nut body as the main part 13 will be placed in the round recess 17 of the washer 14. Then some portions, for example three portions, of a periphery of said recess 17 will be deformed to provide such arc-shaped flashes 18 that can firmly retain the washer 14 on the disc spring 12. The nut body 11 thus connected by the spring 12 to the washer 14 is rotatable relative thereto to provide an integrated washer based nut 10.

In use, this washer based nut 10 will be screwed on an anchor bolt (not shown) extending through and protruding outward whereby a torque applied to the nut body 11 will produce a thrust to press the frustum disc spring 12.

Although this spring tends to expand in a centrifugal direction due to such a thrust, its outer periphery abutting the inner perimeter of round recess 17 will forcibly reduce the diameter of a central opening 19 of said spring. As a result, the inner peripheral end portion of cylindrical boss 15 will not only be strongly pressed between the spring 12 and the washer 14 but also be forced centripetally inward towards the anchor bolt not shown, thereby affording an anti-loosening effect to the nut body.

The round washer 14 in the above example may be replaced with a square one 14' as shown by the phantom lines in FIG. 1, if necessary or so desired. The same features as described will also apply to or be afforded in such an alternative case.

In summary, the regular type nut 13 has its frustum disc spring 12 fitted in the round recess 17 that is formed in the washer 14 to face the nut and the spring, and two or more portions of the periphery surrounding the round recess are deformed (i.e., permanently deformed by a mechanical means) to thereby fix the washer on the spring 12. The washer based nut 10 having the washer 14 rotatable around it can now be produced at a lowered cost. The works for fastening the wooden articles are now simplified, and management of necessary parts or members is also rendered easier.

The round recess 17 receiving the spring the nut body is formed in the side facing them, so that the thinned peripheral zone defining the round recess does not affect adversely the mechanical strength of this zone withstanding the fastening thrust. The central opening 19 of the frustum disc spring 12 tends to decrease its diameter when driving the nut unit, thereby pressing the boss 15 of the nut body 11 towards the anchor bolt or the like and affording an excellent anti-loosening effect for the nut unit.

What I claim is:

1. A washer based nut comprising:

a nut body;

a frustum disc spring of a countersunk shape, the disc spring rotatably fitting on a foot portion of the nut body; and a washer disposed beneath the disc spring so as to bear against wooden articles, the washer having a thickness greater than a thickness of the frustum disc spring, a central bore and a round recess formed around and coaxial with the bore in a top face of the washer, the round recess facing the nut body and the frustum disc spring and surrounded by a circular periphery having a diameter substantially equal to or slightly greater than an outer diameter of the frustum disc spring such that the latter is fitted in the round recess, wherein at least two portions of the circular periphery defining the recess are deformed to provide arc shaped flashes retaining the washer on the frustum disc spring.

2. A washer based nut as defined in claim 1, wherein the nut body has a cylindrical boss as the foot portion continuing from the nut body and having a free end peripheral portion deformed to grip the frustum disc spring between the nut body and the boss.

3. A washer based nut as defined in claim 1, wherein a depth of the round recess is substantially half the thickness of the washer.

4. A washer based nut as defined in claim 1, wherein the nut body is classified in the group 'M12', and the washer has a round outer periphery, a thickness of 4 mm, and an outer diameter of 45 mm.

5. A washer based nut as defined in claim 4, wherein the central bore of the washer has a diameter of 13 mm.

6. A washer based nut as defined in claim 1, wherein the nut body is classified in the group 'M12', and the washer has a square outer periphery, a thickness of 4 mm, and an outer size of 45 mm×45 mm.

7. A washer based nut as defined in claim 6, wherein the central bore of the washer has a diameter of 13 mm.

8. A washer based nut as defined in claim 1, wherein the washer has an outer diameter and a thickness great enough to avoid cutting into wooden foundations when the nut body is forcibly driven and tightened on an anchor bolt.

9. A washer based nut as defined in claim 1, wherein a bottom face of the washer is planar.

10. A washer based nut as defined in claim 1, wherein a radial length of a space between an outer periphery of the washer and the outer diameter of the recess is a plurality of times greater than the thickness of the frustum disc spring.

* * * * *